United States Patent
Labour et al.

(10) Patent No.: US 7,506,123 B1
(45) Date of Patent: Mar. 17, 2009

(54) METHOD AND SYSTEM FOR PERFORMING MEMORY COPY FUNCTION ON A CELL PROCESSOR

(75) Inventors: Antoine Labour, Mountain View, CA (US); Richard B. Stenson, Foster City, CA (US); John P. Bates, Redwood City, CA (US)

(73) Assignee: Sony Computer Entertainment Inc. (JP)

( * ) Notice: Subject to any disclaimer, the term of this patent is extended or adjusted under 35 U.S.C. 154(b) by 209 days.

(21) Appl. No.: 11/238,085

(22) Filed: Sep. 27, 2005
(Under 37 CFR 1.47)

(51) Int. Cl.
*G06F 12/00* (2006.01)
(52) U.S. Cl. ...................................... 711/165
(58) Field of Classification Search ................ 345/502, 345/503, 505, 519; 711/165
See application file for complete search history.

(56) References Cited

U.S. PATENT DOCUMENTS

| | | | | |
|---|---|---|---|---|
| 3,496,551 | A | 2/1970 | Driscoll et al. ............ 340/172.5 |
| 5,185,694 | A * | 2/1993 | Edenfield et al. ............. 710/107 |
| 5,452,452 | A | 9/1995 | Gaetner et al. .............. 395/650 |
| 5,592,671 | A | 1/1997 | Hirayama .................... 385/674 |
| 5,745,778 | A | 4/1998 | Alfieri ................... 395/800.01 |
| 5,794,017 | A | 8/1998 | Evans et al. ................. 395/507 |
| 5,832,262 | A | 11/1998 | Johnson et al. ............. 395/672 |
| 6,003,112 | A * | 12/1999 | Tetrick ........................ 711/100 |
| 6,144,986 | A * | 11/2000 | Silver ......................... 709/201 |
| 6,289,369 | B1 | 9/2001 | Sundaresan ................. 709/103 |
| 6,370,681 | B1 * | 4/2002 | Dellarocas et al. .......... 717/110 |
| 6,665,699 | B1 | 12/2003 | Hunter et al. ............... 709/102 |
| 6,665,783 | B2 * | 12/2003 | Zahir .......................... 711/165 |
| 6,728,959 | B1 | 4/2004 | Merkey ...................... 718/102 |
| 7,058,750 | B1 * | 6/2006 | Rankin et al. ............... 710/317 |
| 7,127,477 | B2 | 10/2006 | Duncombe et al. .......... 707/203 |
| 7,236,738 | B2 | 6/2007 | Settle ........................ 455/3.01 |
| 7,236,998 | B2 | 6/2007 | Nutter et al. ................. 708/446 |
| 7,298,377 | B2 | 11/2007 | Fossum et al. .............. 345/584 |
| 7,304,646 | B2 | 12/2007 | Iwata ......................... 345/537 |
| 7,321,958 | B2 | 1/2008 | Hofstee et al. .............. 711/153 |
| 2002/0138637 | A1 | 9/2002 | Suzuoki et al. ............. 709/230 |
| 2004/0054883 | A1 | 3/2004 | Goodman et al. .............. 713/1 |
| 2005/0188372 | A1 | 8/2005 | Inoue et al. ................. 718/100 |
| 2005/0188373 | A1 | 8/2005 | Inoue et al. ................. 718/100 |

FOREIGN PATENT DOCUMENTS

| | | |
|---|---|---|
| EP | 0 806 730 | 11/1997 |
| GB | 2394336 | 4/2004 |

(Continued)

OTHER PUBLICATIONS

Sony Computer Entertainment Incorporated, "Cell Broadband Engine Architecture", Version 1.0, Aug. 8, 2005.

(Continued)

*Primary Examiner*—Pierre-Michel Bataille
*Assistant Examiner*—John P Fishburn
(74) *Attorney, Agent, or Firm*—Joshua D. Isenberg; JDI Patent (57) ABSTRACT

Methods copying data from one location to another in a main memory of a cell processor are disclosed. A portion of the data is transferred a first main memory location to the local store of one or more SPU and then transferred from the local store to a second main memory location.

16 Claims, 8 Drawing Sheets

FOREIGN PATENT DOCUMENTS

| | | |
|---|---|---|
| WO | WO 97/06484 | 2/1997 |
| WO | WO 02/091180 | 11/2002 |
| WO | WO 2004/084069 | 9/2004 |

OTHER PUBLICATIONS

Pratit Santiprabhob et al. "Fuzzy Rule-Based Process Scheduling Method for Critical Distributed Computing Environment"—Proceedings 2003 IEEE, Mar. 8, 2003, vol. 5, pp. 52267-52276.

J. A. Kahle et al. "Introduction to the Cell Multiprocessor" IBM Journal of Research and Development, vol. 49, No. 4-5, , Jul. 2005, pp. 589-604.

George M. Candea et al. "Vassal: Loadable Scheduler Support for Multi-Policy Scheduling" Proceedings of the Usenix Window NT Symposium, Aug. 1998, pp. 157-166.

Alexandre E. Eichenberger et al., "Optimizing Compiler for a Cell Processor", Proceedings of 14th International Conference on Parallel Architectures and Compilation Techniques, 2005 (PACT'05), pp. 161-172.

B. Flachs et al., "A Streaming Processing Unit for a Cell Processor", 2005 IEEE International Solid-State Circuits Conference—Digest of Technical Papers, pp. 134-135.

Scott Whitman, "Dynamic Load Balancing for Parallel Polygon Rendering", IEEE Computer Graphics and Applications, vol. 14, No. 4, Jul. 1994, pp. 41-48.

Jaspal Subhlok et al., "Communication and Memory Requirements as the Basis for Mapping Task and Data Parallel Programs", Supercomputing' 94, Proceedings Washington, DC, 1994 IEEE, pp. 330-339.

Alan Heirich, "Optimal Automatic Multi-Pass Shader Partitioning by Dynamic Programming", Graphics Hardware (2005), pp. 91-98.

International application No. PCT/US2006/037345 (SCEA05009WO00), "The International Search Report" and "The Written Opinion of the International Searching Authority".

International application No. PCT/US2006/037334 (SCEA05009WO01), "The International Search Report and The Written Opinion of the International Searching Authority".

International application No. PCT/US2006/037336 (SCEA05013WO00), "The International Search Report and The Written Opinion of the International Searching Authority".

International application No. PCT/US2006/037338 (SCEA05015WO00), "The International Search Report and The Written Opinion of the International Searching Authority".

U.S. Appl. No. 11/238,077, entitled "Cell Processor Methods and Apparatus", to John P. Bates et al, filed Sep. 27, 2005.

U.S. Appl. No. 11/257,761, entitled "Secure Operation of Cell Processors", to Tatsuya Iwamoto, filed Oct. 24, 2005.

U.S. Appl. No. 11/238,087, entitled "SPU Task Manager for Cell Processor", to John P. Bates et al, filed Sep. 27, 2005.

U.S. Appl. No. 11/238,086, entitled "Operating Cell Processors Over a Network", to Tatsuya Iwamoto, filed Sep. 27, 2005.

U.S. Appl. No. 11/238,095, entitled "Cell Processor Task and Data Management", to Richard B. Stenson et al, filed Sep. 27, 2005.

Office Action dated Nov. 24, 2008 for U.S. Appl. No. 11/257,761, 7 pages.

Office Action dated Nov. 4, 2008 for U.S. Appl. No. 11/238,086, 7 pages.

* cited by examiner

```
void start(...)
{
   // Mem copy sizes have already been set to multiples of 16KB or less
by PPU // SpuLocalStoreBuffer is a Local Store buffer that is aligned to
128 bytes.

// Match alignment of Local Store buffer to alignment of main memory
source address.
   // This will result in a 2x DMA performance over non-aligned.
   SpuLocalStoreInput = (SpuLocalStoreBuffer | (MainMemorySourceAddress
& 127));

// Start input DMA
   dmaGet(SpuLocalStoreInput, MainMemorySourceAddress,
MemCopyChunkSize);
}
void spumain(...)
{
   // Wait for source buffer to finish transferring from main memory to
SPU Local Store.
   dmaWait(...);   // The destination address for the mem copy may have
a different alignment than the
   // source address.  If so, we are going to shift the Local Store
buffer to match the
   // destination alignment. It is assumed that it is faster to perform
this shift
   // operation on the SPU than it is to wait for the slower, unaligned
DMA.   // Calculate the preferred address of the output buffer from
alignment of the
   // main memory destination address.
   SpuLocalStoreOutput = (SpuLocalStoreBuffer |
(MainMemoryDestinationAddress & 127));

// If the alignment of the input and output buffer is different,
shift the
   // data in the SPU Local Store so that they match.
   if(SpuLocalStoreInput != SpuLocalStoreOutput)
   {
      // Shift the SpuLocalStoreInput buffer so that it starts at
SpuLocalStoreOutput
   }   // Start output DMA
   dmaPut(SpuLocalStoreOutput, MainMemoryDestinationAddress,
MemCopyChunkSize);
} void finish(...)
{
   // Wait for output buffer to finish transferring from SPU Local
Store to main memory.
   dmaWait(...);
}
```

© 2005 SONY COMPUTER ENTERTAINMENT INC.

METHOD AND SYSTEM FOR PERFORMING MEMORY COPY FUNCTION ON A CELL PROCESSOR

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but other-wise reserves all copyright rights whatsoever.

CROSS-REFERENCE TO RELATED APPLICATIONS

This application is related to commonly-assigned U.S. patent application Ser. No. 11/238,077 entitled "CELL PROCESSOR METHODS AND APPARATUS" to John P. Bates, Payton R. White and Attila Vass, which is filed the same day as the present application, the entire disclosures of which are incorporated herein by reference.

This application is related to commonly-assigned U.S. patent application Ser. No. 11/238,087 entitled "SPU TASK MANAGER FOR CELL PROCESSOR" to John P. Bates, Payton R. White, Richard Stenson, Howard Berkey, Attila Vass and Mark Cerny, which is filed the same day as the present application, the entire disclosures of which are incorporated herein by reference.

This application is also related to commonly-assigned U.S. patent application Ser. No. 11/238,095 entitled "CELL PROCESSOR TASK AND DATA MANAGEMENT" to Richard B. Stenson and John P. Bates, which is filed the same day as the present application, the entire disclosures of which are incorporated herein by reference.

This application is also related to commonly-assigned U.S. patent application Ser. No. 11/238,086 entitled "OPERATING CELL PROCESSORS OVER A NETWORK" to Tatsuya Iwamoto, which is filed the same day as the present application, the entire disclosures of which are incorporated herein by reference.

FIELD OF THE INVENTION

Embodiments of the present invention are directed to parallel processing and more particularly to manipulation of data in a main memory of a cell processor.

BACKGROUND OF THE INVENTION

Cell processors are a type of microprocessor that utilizes parallel processing. The basic configuration of a cell processor includes a "Power Processor Element" ("PPE") (sometimes called "Processing Element", or "PE"), and multiple "Synergistic Processing Elements" ("SPE"). The PPEs and SPEs are linked together by an internal high speed bus dubbed "Element Interconnect Bus" ("EIB"). Cell processors are designed to be scalable for use in applications ranging from the hand held devices to main frame computers.

A typical cell processor has one PPE and up to 8 SPE. Each SPU is typically a single chip or part of a single chip containing a main processor and a co-processor. All of the SPUs and the PPU can access a main memory, e.g., through a memory flow controller (MFC). The SPUs can perform parallel processing of operations in conjunction with a program running on the main processor. The SPUs have small local memories (typically about 256 kilobytes) that must be managed by software—code and data must be manually transferred to/from the local SPU memories. For high performance, this code and data must be managed from SPU software (PPU software involvement must be minimized). There are many techniques for managing code and data from the SPU. Often, different techniques for managing code and data from the SPU need to operate simultaneously on a cell processor. There are many programming models for SPU-driven task management. Unfortunately, no single task system is right for all applications.

Cell processors often have to move data from one location in the main memory to another location. For small amounts of data the PPU can perform this operation relatively quickly since the data can be cached.

Thus, there is a need in the art, for a method and system for distributing cell processor tasks and managing cell processor data in a way that addresses such problems.

SUMMARY OF THE INVENTION

To overcome the above disadvantages, embodiments of the invention are directed to copying data from one location to another in a main memory of a cell processor having the main memory, one or more power processor units (PPU) and one or more synergistic processing elements (SPE). Each SPE has a synergistic processor and an associated local store. A portion of the data is transferred a first main memory location to the local store of one or more SPU and then transferred from the local store to a second main memory location.

BRIEF DESCRIPTION OF THE DRAWINGS

The teachings of the present invention can be readily understood by considering the following detailed description in conjunction with the accompanying drawings, in which:

FIG. 2B is a code listing of a SPU MEMCOPY program according to an embodiment of the present invention.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Embodiments of the present invention are directed to a cell processor routine that uses one or more SPU to copy data from one location in main memory to another location in main memory. In embodiments of the invention large blocks of memory can be managed by dividing them up into segments that can fit into the local store of a cell processor's synergistic processing elements (SPE).

In embodiments of the present invention cell data management relies on the fact that above a certain copy size, SPUs can implement direct memory access (DMA) transfers of data in or out of local storage faster than a PPU can.

Figure 1:
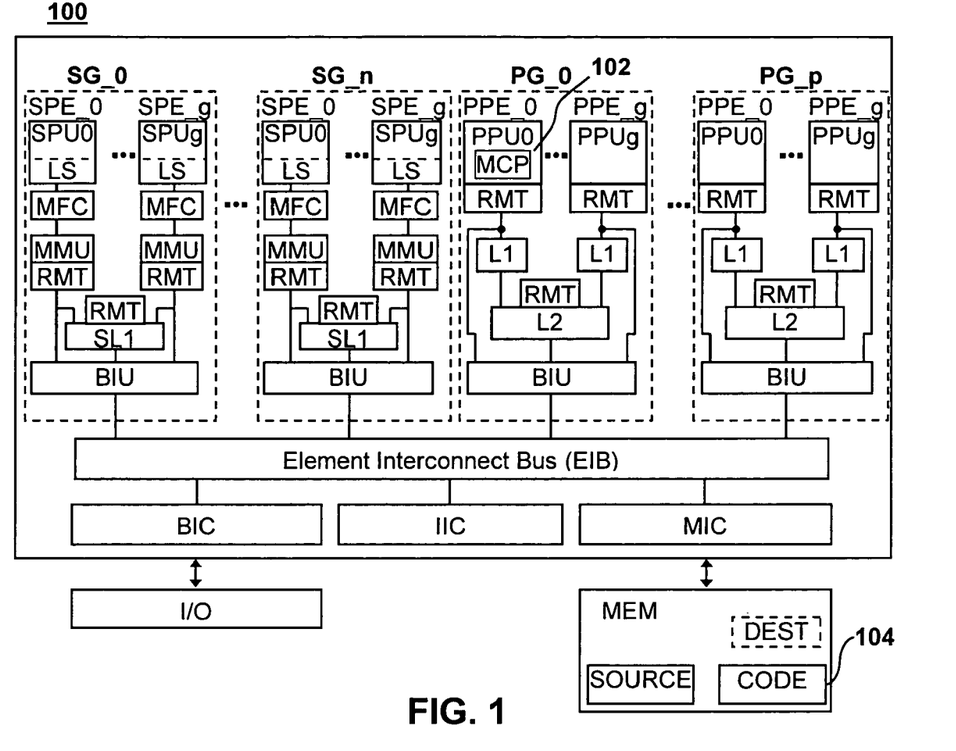
FIG. 1 is a schematic diagram of a cell broadband engine architecture implementing Cell Task and Data Management according to an embodiment of the present invention.

By way of example, and without limitation, FIG. 1 illustrates a type of cell processor 100 characterized by an architecture known as Cell Broadband engine architecture (CBEA)-compliant processor. A cell processor can include multiple groups of PPEs (PPE groups) and multiple groups of SPEs (SPE groups) as shown in this example. Alternatively, the cell processor may have only a single SPE group and a single PPE group with a single SPE and a single PPE. Hardware resources can be shared between units within a group. However, the SPEs and PPEs must appear to software as independent elements.

In the example depicted in FIG. 1, the cell processor 100 includes a number of groups of SPEs SG-0 . . . SG_n and a number of groups of PPEs PG_0 . . . PG_p. Each SPE group includes a number of SPEs SPE0 . . . SPEg. The cell processor 100 also includes a main memory MEM and an input/output function I/O.

Each PPE group includes a number of PPEs PPE_0 . . . PPE_g SPE. In this example a group of SPEs shares a single cache SL1. The cache SL1 is a first-level cache for direct memory access (DMA) transfers between local storage and main storage. Each PPE in a group has its own first level (internal) cache L1. In addition the PPEs in a group share a single second-level (external) cache L2. While caches are shown for the SPE and PPE in FIG. 1, they are optional for cell processors in general and CBEA in particular.

An Element Interconnect Bus EIB connects the various components listed above. The SPEs of each SPE group and the PPEs of each PPE group can access the EIB through bus interface units BIU. The cell processor 100 also includes two controllers typically found in a processor: a Memory Interface Controller MIC that controls the flow of data between the EIB and the main memory MEM, and a Bus Interface Controller BIC, which controls the flow of data between the I/O and the EIB. Although the requirements for the MIC, BIC, BIUs and EIB may vary widely for different implementations, those of skill in the art will be familiar their functions and circuits for implementing them.

Each SPE includes an SPU (SPU0 . . . SPUg). Each SPU in an SPE group has its own local storage area LS and a dedicated memory flow controller MFC that includes an associated memory management unit MMU that can hold and process memory-protection and access-permission information.

The PPEs may be 64-bit PowerPC Processor Units (PPUs) with associated caches. A CBEA-compliant system includes a vector multimedia extension unit in the PPE. The PPEs are general-purpose processing units, which can access system management resources (such as the memory-protection tables, for example). Hardware resources defined in the CBEA are mapped explicitly to the real address space as seen by the PPEs. Therefore, any PPE can address any of these resources directly by using an appropriate effective address value. A primary function of the PPEs is the management and allocation of tasks for the SPEs in a system.

The SPUs are less complex computational units than PPEs, in that they do not perform any system management functions. They generally have a single instruction, multiple data (SIMD) capability and typically process data and initiate any required data transfers (subject to access properties set up by a PPE) in order to perform their allocated tasks. The purpose of the SPU is to enable applications that require a higher computational unit density and can effectively use the provided instruction set. A significant number of SPUs in a system, managed by the PPEs, allow for cost-effective processing over a wide range of applications. The SPUs implement a new instruction set architecture.

MFC components are essentially the data transfer engines. The MFC provides the primary method for data transfer, protection, and synchronization between main storage of the cell processor and the local storage of an SPE. An MFC command describes the transfer to be performed. A principal architectural objective of the MFC is to perform these data transfer operations in as fast and as fair a manner as possible, thereby maximizing the overall throughput of a cell processor. Commands for transferring data are referred to as MFC DMA commands. These commands are converted into DMA transfers between the local storage domain and main storage domain.

Each MFC can typically support multiple DMA transfers at the same time and can maintain and process multiple MFC commands. In order to accomplish this, the MFC maintains and processes queues of MFC commands. The MFC can queue multiple transfer requests and issues them concurrently. Each MFC provides one queue for the associated SPU (MFC SPU command queue) and one queue for other processors and devices (MFC proxy command queue). Logically, a set of MFC queues is always associated with each SPU in a cell processor, but some implementations of the architecture can share a single physical MFC between multiple SPUs, such as an SPU group. In such cases, all the MFC facilities must appear to software as independent for each SPU. Each MFC DMA data transfer command request involves both a local storage address (LSA) and an effective address (EA). The local storage address can directly address only the local storage area of its associated SPU. The effective address has a more general application, in that it can reference main storage, including all the SPU local storage areas, if they are aliased into the real address space (that is, if MFC_SR1[D] is set to '1').

An MFC presents two types of interfaces: one to the SPUs and another to all other processors and devices in a processing group. The SPUs use a channel interface to control the MFC. In this case, code running on an SPU can only access the MFC SPU command queue for that SPU. Other processors and devices control the MFC by using memory-mapped registers. It is possible for any processor and device in the system to control an MFC and to issue MFC proxy command requests on behalf of the SPU. The MFC also supports bandwidth reservation and data synchronization features. To facilitate communication between the SPUs and/or between the SPUs and the PPU, the SPEs and PPEs may include signal notification registers that are tied to signaling events. Typically, the PPEs and SPEs are coupled by a star topology in which the PPE acts as a router to transmit messages to the SPEs. Such a topology does not provide for direct communication between SPEs. Instead each SPE and each PPE has a one-way signal notification register referred to as a mailbox. The mailbox can be used for SPE to host OS synchronization.

The IIC component manages the priority of the interrupts presented to the PPEs. The main purpose of the IIC is to allow interrupts from the other components in the processor to be handled without using the main system interrupt controller. The IIC is really a second level controller. It is intended to handle all interrupts internal to a CBEA-compliant processor or within a multiprocessor system of CBEA-compliant processors. The system interrupt controller will typically handle all interrupts external to the cell processor.

In a cell processor system, software often must first check the IIC to determine if the interrupt was sourced from an external system interrupt controller. The IIC is not intended to replace the main system interrupt controller for handling interrupts from all I/O devices.

There are two types of storage domains within the cell processor: local storage domain and main storage domain. The local storage of the SPEs exists in the local storage domain. All other facilities and memory are in the main storage domain. Local storage consists of one or more separate areas of memory storage, each one associated with a specific SPU. Each SPU can only execute instructions (including data load and data store operations) from within its own associated local storage domain. Therefore, any required data transfers to, or from, storage elsewhere in a system must always be performed by issuing an MFC DMA command to transfer data between the local storage domain (of the individual SPU) and the main storage domain, unless local storage aliasing is enabled.

An SPU program references its local storage domain using a local address. However, privileged software can allow the local storage domain of the SPU to be aliased into main storage domain by setting the D bit of the MFC_SR1 to '1'. Each local storage area is assigned a real address within the main storage domain. (A real address is either the address of a byte in the system memory, or a byte on an I/O device.) This allows privileged software to map a local storage area into the effective address space of an application to allow DMA transfers between the local storage of one SPU and the local storage of another SPU.

Other processors or devices with access to the main storage domain can directly access the local storage area, which has been aliased into the main storage domain using the effective address or I/O bus address that has been mapped through a translation method to the real address space represented by the main storage domain.

Data transfers that use the local storage area aliased in the main storage domain should do so as caching inhibited, since these accesses are not coherent with the SPU local storage accesses (that is, SPU load, store, instruction fetch) in its local storage domain. Aliasing the local storage areas into the real address space of the main storage domain allows any other processors or devices, which have access to the main storage area, direct access to local storage. However, since aliased local storage must be treated as non-cacheable, transferring a large amount of data using the PPE load and store instructions can result in poor performance. Data transfers between the local storage domain and the main storage domain should use the MFC DMA commands to avoid stalls.

The addressing of main storage in the CBEA is compatible with the addressing defined in the PowerPC Architecture. The CBEA builds upon the concepts of the PowerPC Architecture and extends them to addressing of main storage by the MFCs.

An application program executing on an SPU or in any other processor or device uses an effective address to access the main memory. The effective address is computed when the PPE performs a load, store, branch, or cache instruction, and when it fetches the next sequential instruction. An SPU program must provide the effective address as a parameter in an MFC command. The effective address is translated to a real address according to the procedures described in the overview of address translation in PowerPC Architecture, Book III. The real address is the location in main storage which is referenced by the translated effective address. Main storage is shared by all PPEs, MFCs, and I/O devices in a system. All information held in this level of storage is visible to all processors and to all devices in the system. This storage area can either be uniform in structure, or can be part of a hierarchical cache structure. Programs reference this level of storage using an effective address.

The main memory of a system typically includes both general-purpose and nonvolatile storage, as well as special-purpose hardware registers or arrays used for functions such as system configuration, data-transfer synchronization, memory-mapped I/O, and I/O subsystems. There are a number of different possible configurations for the main memory. By way of example and without limitation, Table I lists the sizes of address spaces in main memory for a particular cell processor implementation known as Cell Broadband Engine Architecture (CBEA).

TABLE I

| Address Space | Size | Description |
| --- | --- | --- |
| Real Address Space | $2^m$ bytes | where $m \leq 62$ |
| Effective Address Space | $2^{64}$ bytes | An effective address is translated to a virtual address using the segment lookaside buffer (SLB). |
| Virtual Address Space | $2^n$ bytes | where $65 \leq 80$ A virtual address is translated to a real address using the page table. |
| Real Page | $2^{12}$ bytes | |
| Virtual Page | $2^p$ bytes | where $12 \leq p \leq 28$ Up to eight page sizes can be supported simultaneously. A small 4-KB (p = 12) page is always supported. The number of large pages and their sizes are implementation-dependent. |
| Segment | $2^{28}$ bytes | The number of virtual segments is $2(n - 28)$ where $65 \leq n \leq 80$ |

Note: The values of "m," "n," and "p" are implementation-dependent.

The cell processor 100 may include an optional facility for managing critical resources within the processor and system. The resources targeted for management under the cell processor are the translation lookaside buffers (TLBs) and data and instruction caches. Management of these resources is controlled by implementation-dependent tables.

Tables for managing TLBs and caches are referred to as replacement management tables RMT, which may be associated with each MMU. Although these tables are optional, it is often useful to provide a table for each critical resource, which can be a bottleneck in the system. An SPE group may also contain an optional cache hierarchy, the SL1 caches, which represent first level caches for DMA transfers. The SL1 caches may also contain an optional RMT.

Code 102 for implementing a memory copy (MEM COPY) function may be stored in the local store of one or more of the SPE and/or main memory MEM. A PPU of one of the PPE groups may call the MEMCOPY code 102 to be executed by one or more SPU. In doing so, the PPU passes the SPE information, such as the source and destination addresses of a block of memory to be copied and the size of the block. The memory MEM may include code 104 to be run by the PPU that determines whether it would be more efficient to perform the MEM COPY with one or more SPU or with just the PPU alone. The MEMCOPY code 102 takes advantage of the fact that memory transfers can be handled much faster by DMA using the SPU than by the PPU. The MEMCOPY takes advantage of this by using an available SPU to transfer data from a SOURCE location in the main memory MEM to a DESTINATION location. Such SPU-based main memory management is particularly advantageous, e.g., where the amount of data that needs to be transferred is such that the SPU DMA speed provides an advantage over DMA transfers using the PPU.

The foregoing is intended to provide an introduction and description of the terminology used in cell processor implementations. The foregoing discussion is also intended to set forth a context for data structures and methods according to embodiments of the present invention. Such embodiments are not limited to implementation on or with cell processors having the architecture described above. However, any or all of the embodiments described below may be implemented using such cell architecture as an environment in which a MEMCOPY function may be encountered and utilized.

Figure 2A:
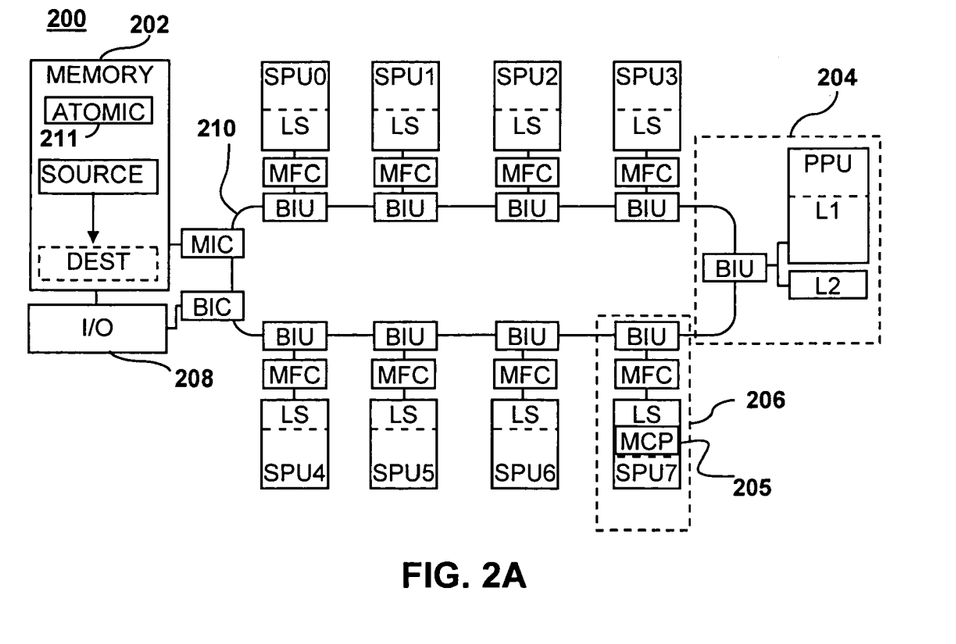
FIG. 2A is a schematic diagram of a cell processor according to an embodiment of the present invention.

FIG. 2 depicts an example of cell processor 200 configured to implement a MEMCOPY program 205 according to an embodiment of the present invention. The cell processor 200 includes a main memory 202, a single PPE 204 and eight SPEs 206. However, the cell processor 201 may be configured with any number of SPE's. With respect to FIG. 2, the memory, PPE, and SPEs can communicate with each other and with an I/O device 208 over a ring-type element interconnect bus 210. In some embodiments of the invention, one particular SPE 206 is dedicated to implementing MEM COPY operations. Alternatively, an SPU manager, such as an SPU task manager (STM) may split up the MEM COPY operation amongst two or more SPU. STM is described in commonly-assigned co-pending application Ser. No. 11/238, 095 entitled "CELL PROCESSOR TASK AND DATA MANAGEMENT" to Richard B. Stenson and John P. Bates, which has been incorporated herein by reference.

The PPE 204 triggers the SPU 206 to run the MEMCOPY program 205 with a function call. The function call may be written in any suitable programming language. By way of example, such a call written in the C programming language might look like:

(void* is a pointer to data in main memory.)
void mem_copy(void* destination, void* source, int size)

The corresponding code that runs on the SPE 206 may be written in any suitable programming language. By way of example, and without limitation, a C programming language version of the SPU MEMCOPY code 205 may be as shown in FIG. 2B. In some cases, the destination address for the MEM COPY may have a different alignment than the source address. In such a case, it is often desirable to shift the Local Store buffer to match the destination alignment. It may be faster to perform this shift operation on the SPU than it is to wait for a slower, unaligned DMA. The code shown in FIG. 2B includes instructions to perform such a shift.

There are a number of different ways for the PPU to trigger the SPU to execute the MEM COPY code 205. By way of example, and without limitation, the PPU may write to an atomic 211 containing a byte that triggers the MEM COPY code 205. Specifically, the PPU can set the trigger byte and also pass the source and destination addresses as well as the data size to the atomic 211. The SPE 204 may run a manager program that polls the atomic 211 and runs the MEM COPY code 205 when it determines that the trigger byte in the atomic has been set. Alternatively, the PPE 204 can trigger the SPE 206 to execute the MEM COPY using signal notification registers or the mailbox.

Figure 3A:
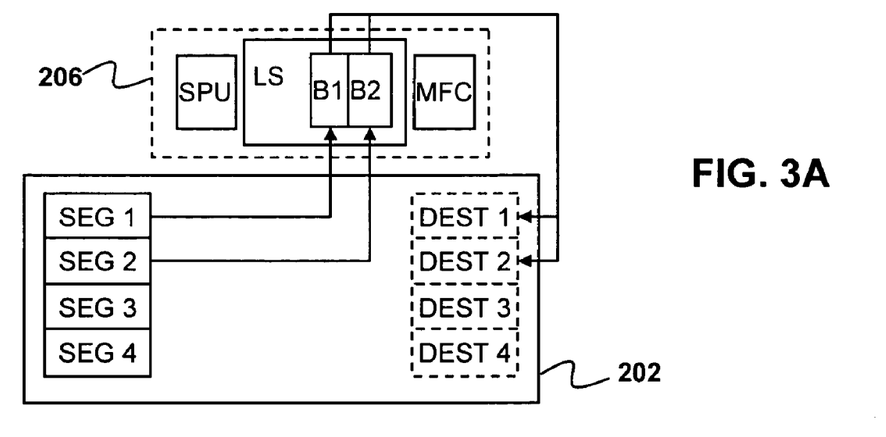
FIGS. 3A-3B are a sequence of block diagrams illustrating a memory copying operation on a cell processor using a single SPU according to an embodiment of the present invention.
Figure 3B:
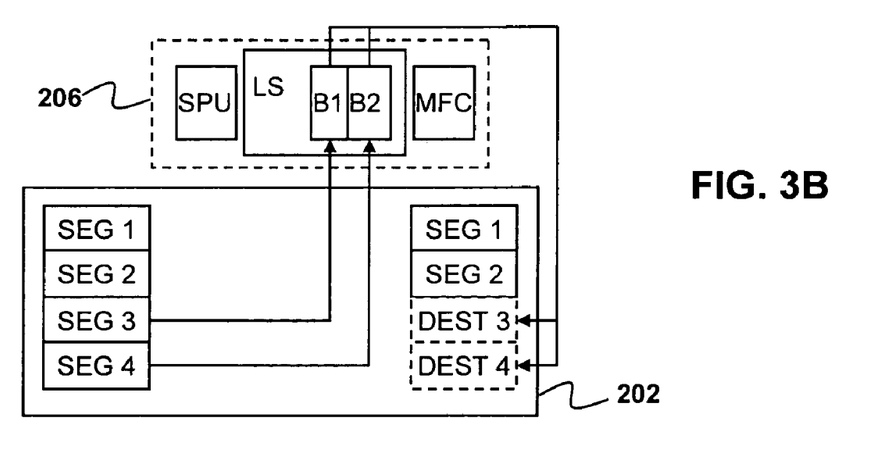
Figure 3C:
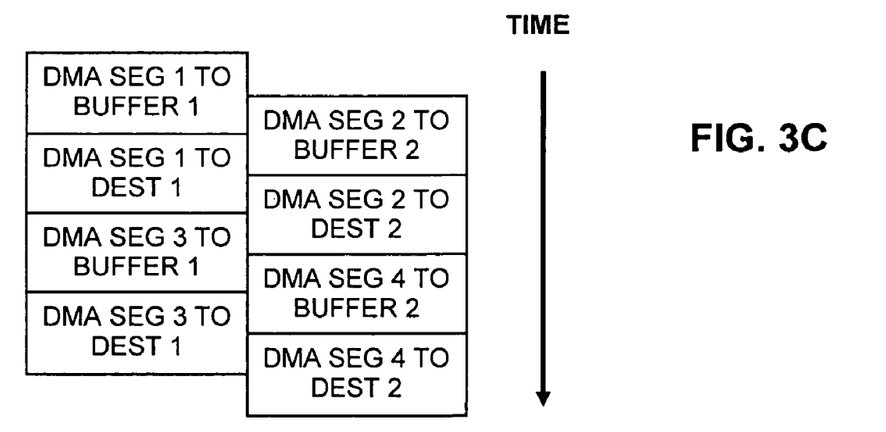
FIG. 3C is a timing diagram illustrating the timing of operations in FIGS. 3A-3B.

Operation of the SPU MEMCOPY function using a single SPU can be understood by referring to FIGS. 3A-3C. In this example, the PPU sends a single task to one SPU for processing the entire mem copy. The SPU MEM COPY program 205 breaks up the data to be copied (if necessary) and performs its own multi-buffering to maximally use the memory bandwidth. In this example, the SPE uses double buffering. Specifically the local store (LS) of the SPE 206 includes first and second buffers B1, B2. To illustrate the double buffering, the source data has been divided into four segments, SEG1, SEG2, SEG3, and SEG4 that are to be transferred to corresponding destination addresses DEST 1, DEST 2, DEST 3 and DEST 4. AS shown in FIG. 3A, the MFC of the SPE 204 DMA transfers SEG1 to B1 and SEG2 to B2. As shown in FIG. 3C, these two DMA transfers can be run in parallel since the MFC can handle more than one DMA operation at a time. As used herein, parallel operation means that at least a portion of two or processes occur at the same time. Note that the DMA transfer of SEG1 starts first and the DMA transfer of SEG2 starts shortly thereafter. Note also that the two DMA operations overlap in time. Once the DMA transfer of SEG1 to B1 is complete, the SPU can instruct the MFC to DMA transfer SEG1 to DEST 1. Note also from FIG. 3C that this operation overlaps partly with the DMA of SEG2 to LS. Similarly, once the DMA transfer of SEG2 from its source address to B2 is complete the SPU can instruct the MFC to DMA transfer SEG2 to DEST 2. Again, this operation may partly overlap in time with the DMA transfer of SEG1 to DEST1.

As shown in FIG. 3B, as soon as B1 is available, the MFC can begin DMA transfer of SEG3 to B1. As can be seen from FIG. 3C, this transfer may take place as SEG2 is being transferred to DEST2. Similarly, once B2 becomes available, DMA transfer of SEG4 to B2 can begin. This transfer may overlap partly with the DMA transfer of SEG3 to B1. As soon as the DMA transfer of SEG3 to B1 is complete, the DMA transfer of SEG3 to DEST 3 can begin. Similarly, as soon as the DMA transfer of SEG4 to B2 is complete, the DMA transfer of SEG4 to DEST 4 can begin. Note from FIG. 3C that these latter two DMA transfers can overlap partly with each other.

In certain embodiments of the present invention the MEM COPY operation may be split between two or more SPE. For example, from the PPU, the MEM COPY operation may be split up into one or more 16 KB STM tasks. STM kernel(s) running on two or more SPE can pipeline the MEM COPY tasks for optimal multi-buffering as described in commonly-assigned co-pending application Ser. No. 11/238,095 entitled "CELL PROCESSOR TASK AND DATA MANAGEMENT" to Richard B. Stenson and John P. Bates, which has been incorporated herein by reference.

Figure 3D:
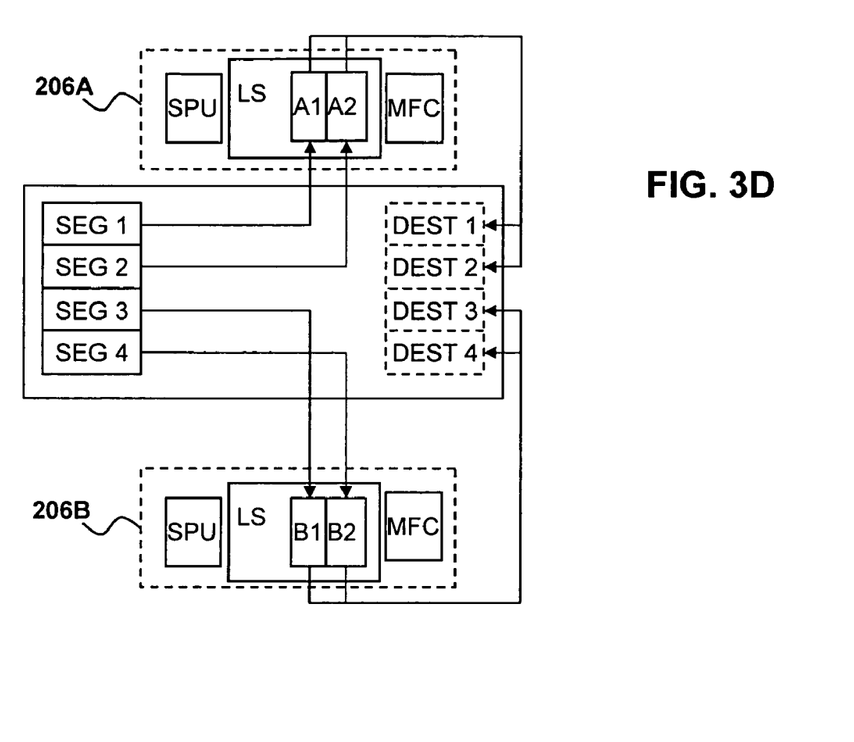
FIG. 3D is a block diagram illustrating memory copying using a cell processor SPU according to an embodiment of the present invention.
Figure 3E:
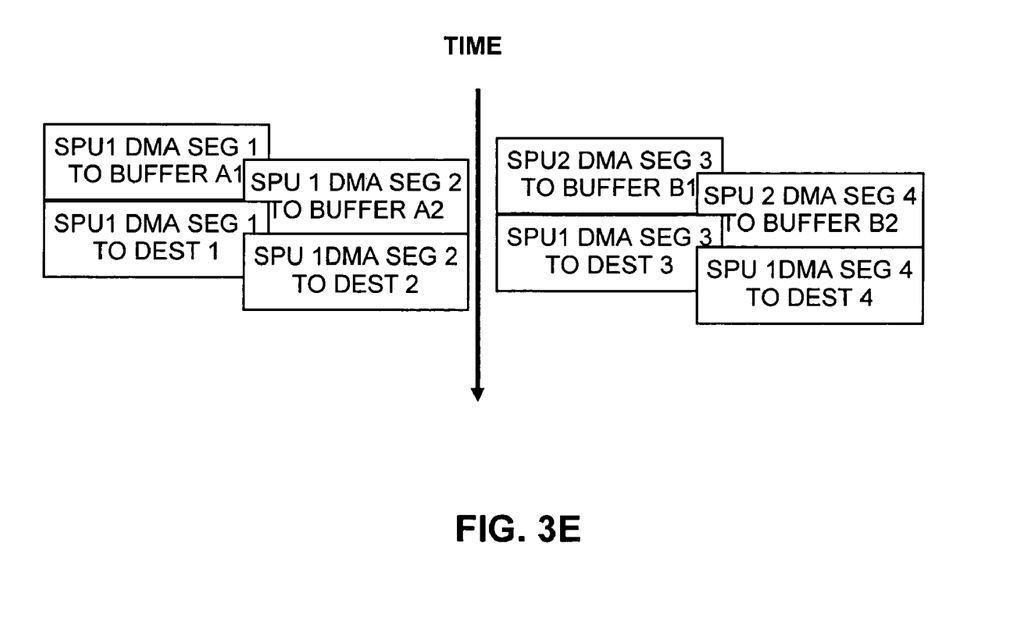
FIG. 3E is a timing diagram illustrating the timing of events in FIG. 3D.

FIGS. 3D-3E illustrate an example of a MEM COPY task split between two SPE. Specifically, as shown in FIG. 3D, two SPE 206A, 206B are used to copy data in four segments from source addresses to corresponding destination addresses. In this example, each SPE has two buffers in its local store as in the previous example. As can be seen from FIG. 3D, SPE 206A copies SEG1, SEG2 to its buffers A1, A2 respectively while SPE 206B copies SEG3 and SEG4 to its buffers B1 and B2 respectively. As can be seen from the timing diagram in FIG. 3E, these transfers can take place in parallel, potentially achieving great efficiency. As in the preceding example, DMA transfers of SEG1 and SEG2 to their respective destination addresses DEST 1 and DEST 2 can begin as soon as the data segments have been copied into their respective buffers. The DMA transfer of SEG1 to DEST 1 can take place in parallel with the DMA transfer of SEG2 to B2. Similarly, SPE 206B can transfer SEG3 and SEG4 to their respective destination addresses in a parallel fashion. Note that in this example the DMA transfer of SEG3 to DEST 3 can begin while the DMA transfer of SEG4 to B2 is still proceeding. Although in the preceding example two SPE are used to perform a MEM COPY those of skill in the art will recognize that any number of SPE may be used. Furthermore, although the above examples utilize double buffering, those of skill in the art that any number of buffers may be used.

Figure 3F:
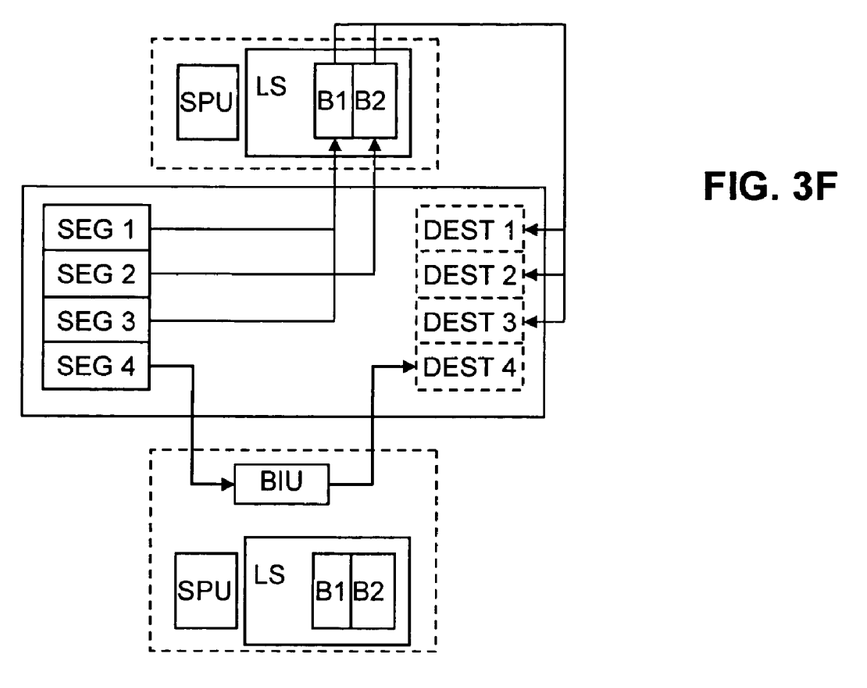
FIG. 3F is a block diagram illustrating memory copying using a cell processor SPU and PPU according to an embodiment of the present invention.
Figure 3G:
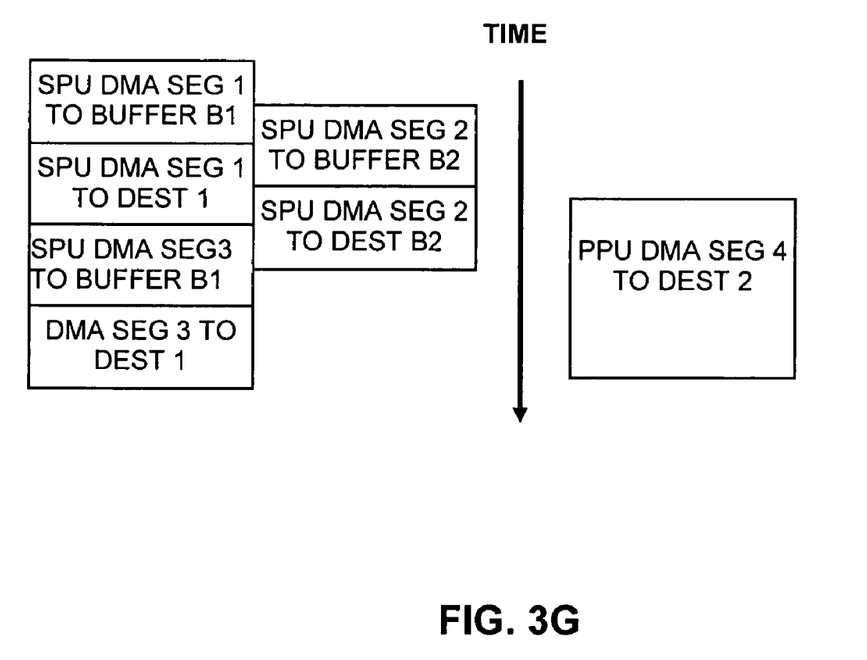
FIG. 3G is a timing diagram illustrating the timing of events in FIG. 3F.

A further advantage can be gained in some situations where the PPE 204 participates in the MEM COPY routine. For example, as depicted in FIGS. 3F-3G, the SPE 206 may transfer SEG1, SEG2, and SEG3 while the PPE 204 transfers SEG4. Such use of the PPE 204 can provide an advantage over MEM COPY operations executed by the SPE 206 alone. Those of skill in the art will recognize that the PPE 204 can also participate in a MEM COPY operation involving multiple SPE.

Figure 4A:
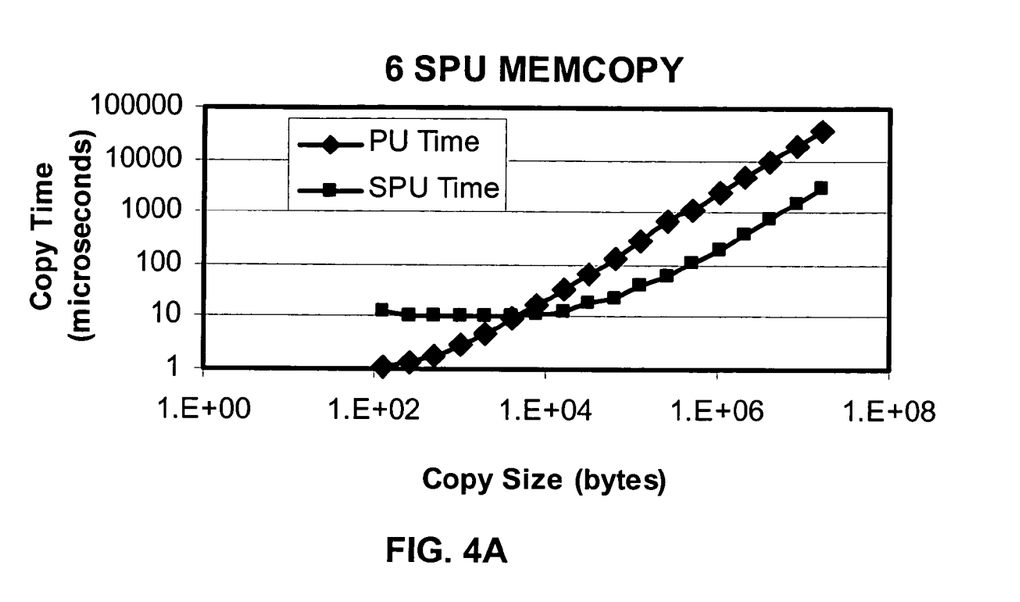
FIG. 4A is a graph illustrating data copy times as a function of data size for a single PPU compared to a single SPU in a cell processor system.
Figure 4B:
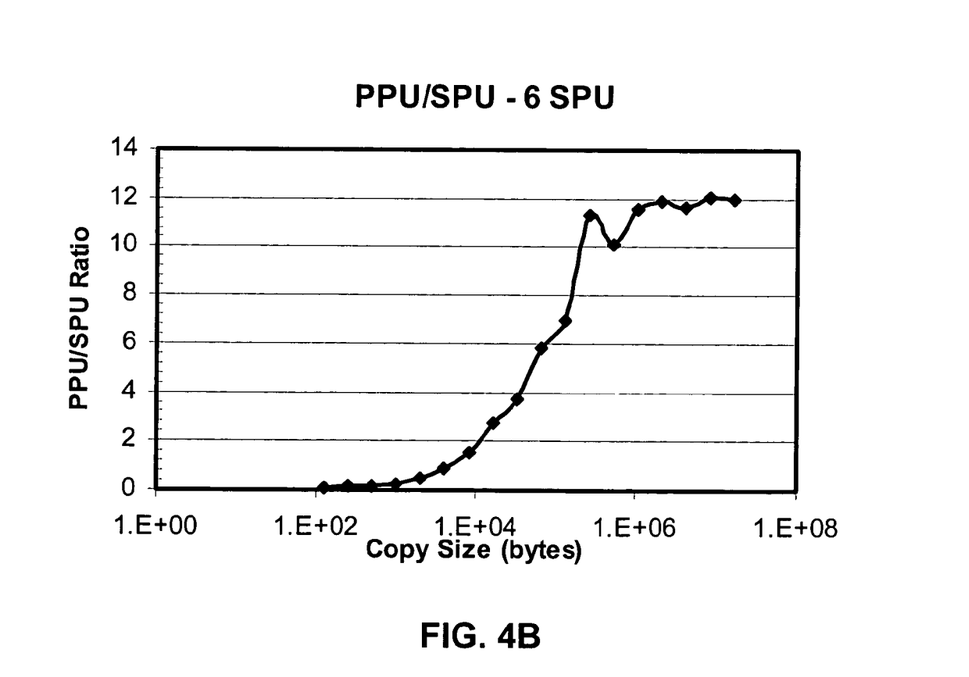
FIG. 4B is a graph illustrating the ratio of PPU time to SPU time for FIG. 4A.

It may not always be the case that SPU-based MEM COPY is superior to PPU-based MEM COPY. The performance of SPU-based MEM COPY relative to PPU based MEM COPY depends on the size of the block of memory that needs to be copied and also on how many SPU are involved in the MEM COPY operation. For example, Table II lists results of SPU-based and PPU-based memory copying times for different sized blocks of data. In this case, the SPU-based copy times are for a MEM COPY operation that uses only a single SPU. These results are graphed in FIG. 4A and FIG. 4B.

TABLE II

| Copy Size (bytes) | PU Time (microseconds) | SPU Time (microseconds) | Ratio of PPU/SPU time |
|---|---|---|---|
| 128 | 1.1275 | 12.235 | 0.092154 |
| 256 | 1.3425 | 10.6275 | 0.126323 |
| 512 | 1.8025 | 10.6725 | 0.168892 |
| 1024 | 2.905 | 10.5025 | 0.276601 |
| 2048 | 4.9775 | 10.6125 | 0.469022 |
| 4096 | 9.03 | 10.5025 | 0.859795 |
| 8192 | 17.4375 | 11.4150 | 1.527595 |
| 16384 | 34.2175 | 12.59 | 2.717832 |
| 32768 | 68.1375 | 18.3175 | 3.719804 |
| 65536 | 136.2899 | 23.3975 | 5.824979 |
| 131072 | 292.5125 | 42.2625 | 6.921325 |
| 262144 | 701.945 | 61.8925 | 11.34136 |
| 524288 | 1072.585 | 106.39 | 10.08163 |
| 1048576 | 2,363 | 203.705 | 11.6008 |
| 2097152 | 4711.942 | 394.7725 | 11.93584 |
| 4194304 | 9202.308 | 792.0825 | 11.61786 |
| 8388608 | 18575.32 | 1542.365 | 12.0434 |
| 16777216 | 37018.45 | 3085.945 | 11.99582 |

Note that for copy sizes below about 8 kilobytes, the PPU performs the copying operation in less time than the SPU and for very small copy sizes, e.g., less than about 500 bytes, the PPU performs the copying operation almost 10 times faster. However, for large copy sizes, e.g., above about 8 kilobytes, the SPU-based MEM COPY operation is more efficient. In particular, for copy sizes above about 250 kilobytes, the SPU-based MEM COPY is about 10 times faster. Thus larger sizes result in a larger performance advantage for the SPU. A small enough copy size results in a performance advantage on the PPU. In the above example there is a break-even point (at about 8 kilobytes) where PPU and SPU can perform the MEM COPY in the same amount of time.

Figure 4C:
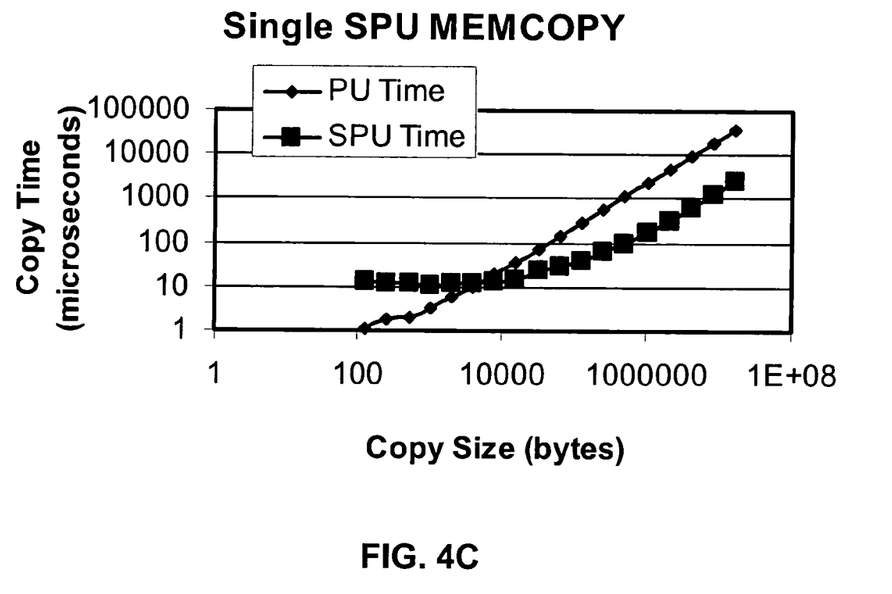
FIG. 4C is a graph illustrating data copy times as a function of data size for a single PPU compared to six SPU in a cell processor system.
Figure 4D:
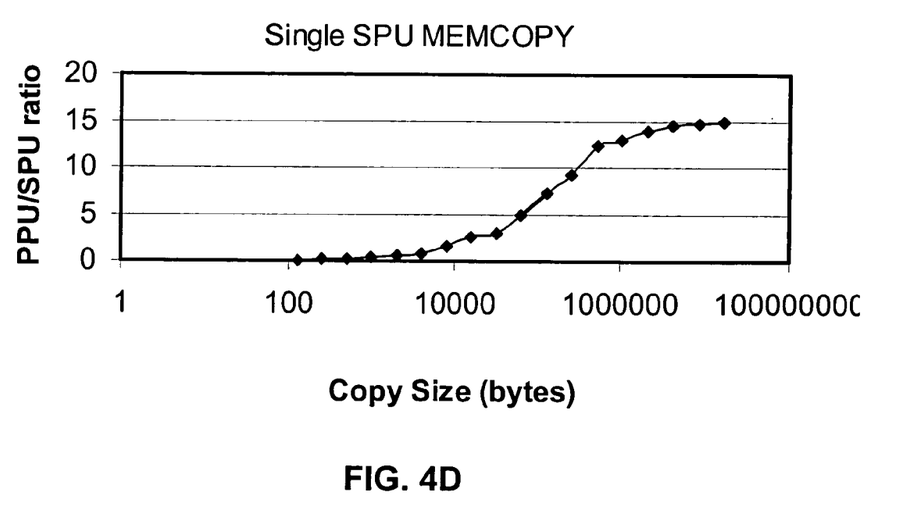
FIG. 4D is a graph illustrating the ratio of PPU time to SPU time for FIG. 4A.

Even better relative performance advantages occur if more than one SPU is used to perform the MEM COPY operation. For example, Table III lists results of SPU-based and PPU-based memory copying times for different sized blocks of data. In this case, the SPU-based copy times are for a MEM COPY operation that uses six SPU. These results are graphed in FIG. 4C and FIG. 4D.

TABLE III

| Copy Size (bytes) | PU Time (microseconds) | SPU Time (microseconds) | Ratio of PPU/SPU time |
|---|---|---|---|
| 128 | 1.15 | 13.3325 | 0.086255 |
| 256 | 1.7275 | 12.135 | 0.142357 |
| 512 | 2.0925 | 11.76 | 0.177934 |
| 1024 | 3.37 | 11.3125 | 0.297901 |
| 2048 | 5.85 | 11.4575 | 0.510583 |
| 4096 | 10.1025 | 11.625 | 0.869032 |
| 8192 | 19.5175 | 13.26 | 1.471908 |
| 16384 | 36.285 | 14.3025 | 2.536969 |
| 32768 | 72.522499 | 24.8175 | 2.922232 |
| 65536 | 140.907501 | 28.23 | 4.99141 |
| 131072 | 281.457489 | 38.56 | 7.299209 |
| 262144 | 575.234985 | 62.205 | 9.247408 |
| 524288 | 1177.540039 | 94.9225 | 12.40528 |
| 1048576 | 2,324 | 178.8125 | 12.99508 |
| 2097152 | 4624.790039 | 331.8575 | 13.93607 |
| 4194304 | 9273.922852 | 643.38 | 14.41438 |
| 8388608 | 18537.32266 | 1256.685 | 14.75097 |
| 16777216 | 37041.30469 | 2495.123 | 14.84549 |

Note that for copy sizes below about 8 kilobytes, the PPU performs the copying operation in less time than the SPU and for very small copy sizes, e.g., less than about 200 bytes, the PPU performs the copying operation almost 10 times faster. However, for large copy sizes, e.g., above about 8 kilobytes, the SPU-based MEM COPY operation is more efficient. In particular, for copy sizes above about 300 kilobytes, the SPU-based MEM COPY is about 10 times faster and almost 15 times faster for 16 Megabyte MEM COPY operations. Thus larger sizes result in a significant performance advantage for the SPU. A small enough copy size results in a performance advantage on the PPU. In the above example there is a break-even point (at about 8 kilobytes) where PPU and SPU can perform the MEM COPY in the same amount of time.

Figure 5:
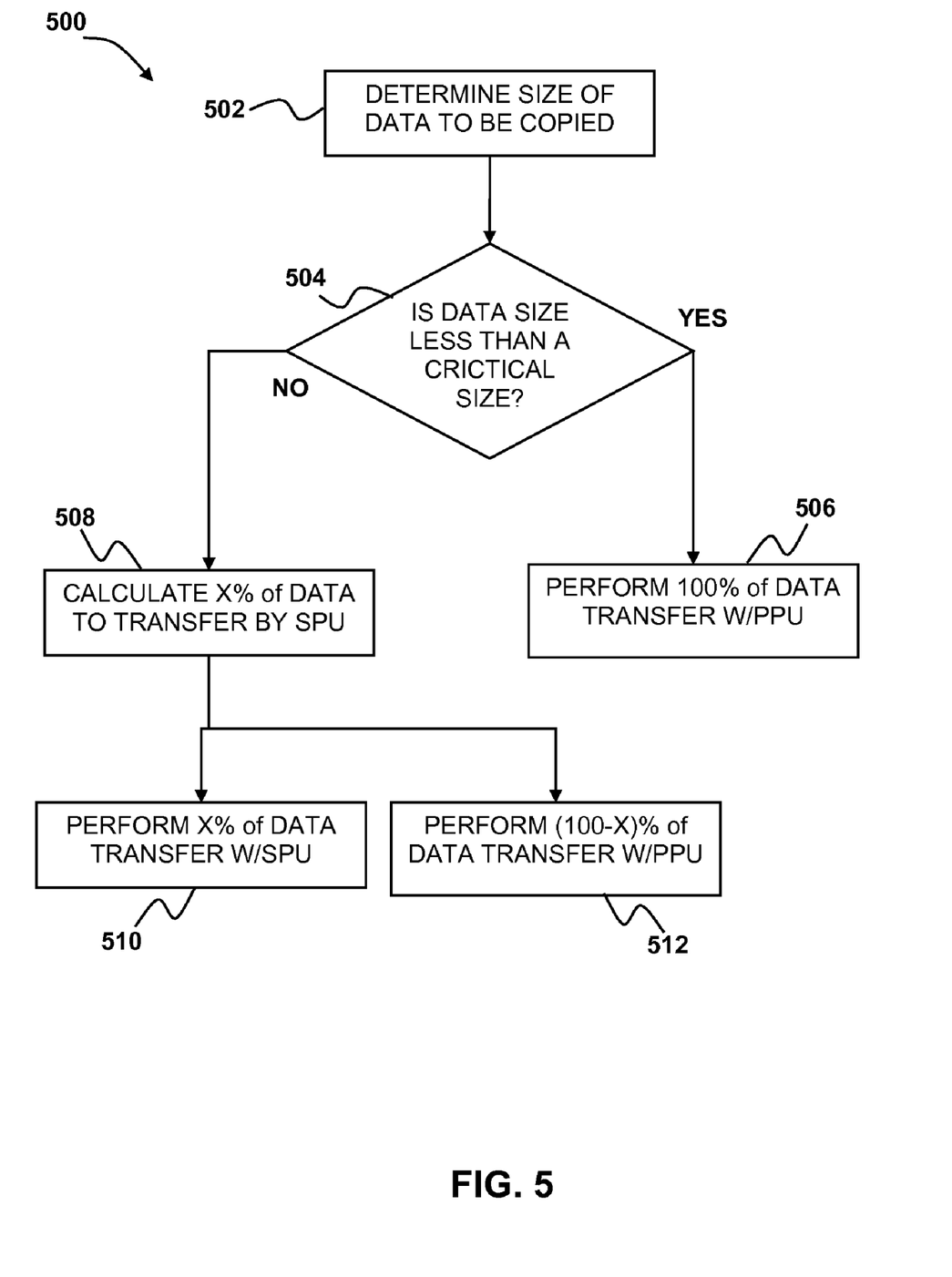
FIG. 5 is a flow diagram illustrating a MEM COPY routine according to an embodiment of the present invention.

As shown in FIG. 5, the PPU may implement a MEM COPY routine 500 in which the PPU determines the size of the data to be copied at 502. If at 504 the size is more than a critical size, the PPU will calculate the percentage of the MEM COPY that it will perform based on the size. If the size is below the critical size, e.g., about 8 kilobytes, the PPU will perform the entire MEM COPY at 506. If at 504 the size is above the critical size, the PPU calculates at 508 a percent X of the data to be transferred using MEM COPY implemented by one or more SPUs at 510. While the SPU(s) are performing their portion of the MEM COPY, the PPU will perform its portion, in parallel at 512.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. In a cell processor having a main memory, one or more power processor units (PPU) and one or more synergistic processing elements (SPE), each SPE having a synergistic processor unit (SPU) and an associated local store, wherein the one or more PPU are configured to access system management resources of the cell processor and the one or more SPE are not configured to perform system management functions, a method for copying data from a first location in the main memory to a second location in the main memory, the method comprising the steps of:
    transferring a portion of the data from the first location to the local store of one or more SPU;
    transferring the portion of the data from the local store to the second location; and
    copying a portion of the data from the first location to the second location using one or more of the PPU.

2. The method of claim 1 wherein the data is characterized by a size of greater than about 8 kilobytes.

3. The method of claim 1, further comprising notifying one or more of the SPU to transfer the data from the first location to the second location.

4. The method of claim 1 wherein one or more of the SPU transfers a first portion of the data into a first buffer in the local store in parallel with transferring a second portion of the data out of a second buffer in the local store.

5. The method of claim 1, further comprising the step of providing a function to one or more of the SPU, wherein the function includes executable instructions for implementing the method.

6. The method of claim 5, further comprising the step of providing values of arguments to a function on one or more of the SPU, wherein the function includes executable instructions for implementing the method.

7. The method of claim 6 wherein the arguments include a source address of the data, a destination address of the data, and a size of the data.

8. The method of claim 6 wherein providing arguments to the function includes writing the values of the arguments to an atomic in the main memory.

9. A cell processor, comprising:
    a data bus
    a main memory coupled to the data bus, the main memory containing one or more task definitions;
    a central processor coupled to the data bus, the central processor including one or more power processor units (PPU);
    one or more synergistic processing elements (SPE) coupled to the data bus, wherein each SPE has a synergistic processor unit (SPU) and a local store, wherein the one or more PPU are configured to access system management resources of the cell processor and the one or more SPE are not configured to perform system management functions; and
    a set of processor executable instructions embodied in the local store of on one or more SPE, wherein the instructions are configured to implement a method for copying data from a first location in the main memory to a second location in the main memory, wherein the method comprises the steps of:
        transferring a portion of the data from the first location to the local store of one or more SPU;
        transferring the portion of the data from the local store to the second location; and
        copying a portion of the data from the first location to the second location using the central processor.

10. The cell processor of claim 9 wherein one of the SPU is dedicated to performing the processor executable instructions.

11. The cell processor of claim 9, further comprising an atomic in the main memory, wherein the atomic includes byte set by the central processor that triggers one or more SPU to execute the processor executable instructions.

12. The cell processor of claim 9, further comprising, an additional set of processor executable instructions embodied in the main memory, the additional set of processor executable instructions including an instruction for determining the size of the data to be copied and an instruction for copying one or portions of the data using one or more of the SPU.

13. The cell processor of claim 9 wherein one or more SPE are configured to transfer multiple portions of the data from the first location to the local store in parallel DMA transfers.

14. The cell processor of claim 9 wherein one or more of the SPE are configured to transfer multiple portions of the data from the local store to the second location in parallel DMA transfers.

15. The method of claim 1, wherein, if the data is characterized by a size below a critical value, all of the data is transferred from the first location to the second location using one or more of the PPU.

16. The method of claim 15 wherein the critical size is about eight kilobytes.

* * * * *